United States Patent [19]

Kendall

[11] 4,189,776
[45] Feb. 19, 1979

[54] SIMPLIFIED IRRIGATION CONTROLLER

[75] Inventor: Thomas L. Kendall, Big Bear Lake, Calif.

[73] Assignee: The Toro Company, Riverside, Calif.

[21] Appl. No.: 907,911

[22] Filed: May 22, 1978

[51] Int. Cl.² .............................................. G06F 15/46
[52] U.S. Cl. ................................. 364/420; 137/624.2;
239/70; 307/41; 364/120; 364/510
[58] Field of Search ............... 364/104, 107, 100, 103,
364/120, 479, 509, 510; 137/624.11, 624.12,
624.13, 624.16, 624.18, 624.19, 624.2; 239/69,
70; 340/309.1, 309.3, 309.4, 310 R, 150, 151;
307/41, 141, 141.4, 141.8; 235/92 FL

[56] References Cited

U.S. PATENT DOCUMENTS

| 3,869,854 | 3/1975 | Church | 137/624.2 X |
| 4,015,366 | 4/1977 | Hall | 364/400 X |
| 4,061,927 | 12/1977 | Link | 307/41 |

FOREIGN PATENT DOCUMENTS 973273  8/1975  Canada ..................................... 364/104

Primary Examiner—Joseph F. Ruggiero
Attorney, Agent, or Firm—Poms, Smith, Lande & Rose

[57] ABSTRACT

The present invention discloses a simplified solid state controller for use in controlling automatic irrigation systems. The operator input panel provides no means for the inputting of numerical irrigation information such as station start times and station run times. Rather, the input panel provides switch means whereby the operator can initiate a number of parameterization logic sequences wherein the current information data in memory is displayed to the operator. Through the input panel, the operator can cause the information displayed to be advanced to a new desired value on a step-by-step basis. Upon the displayed value being equal to the value desired as the new value by the operator, the operator signals to the logic of the controller through the input panel and the current value is updated to the presently displayed value.

7 Claims, 9 Drawing Figures

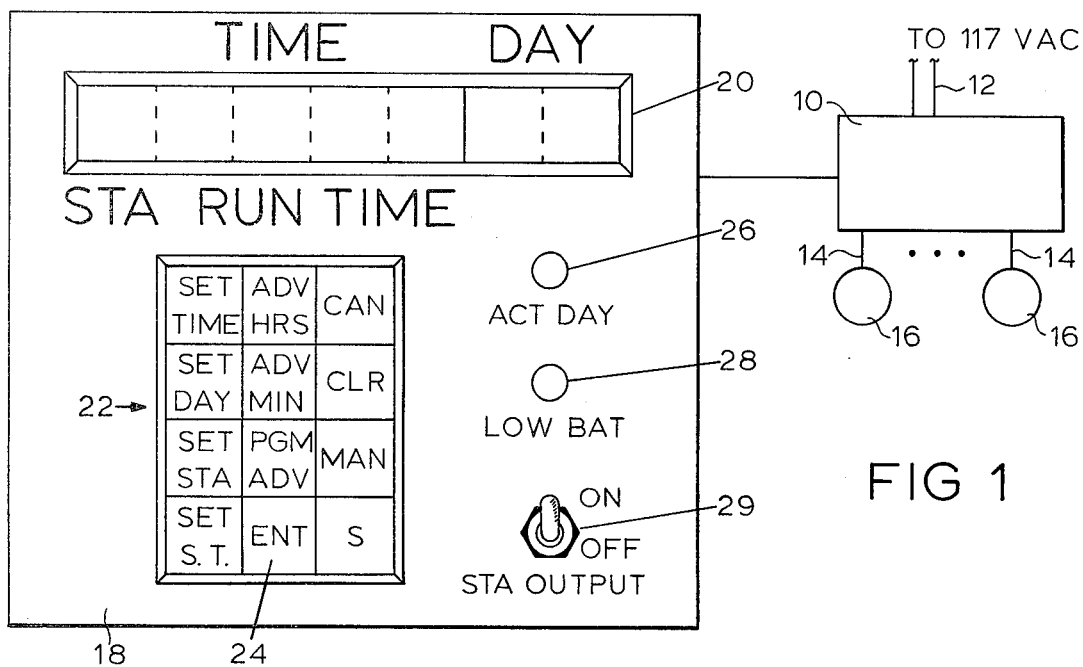
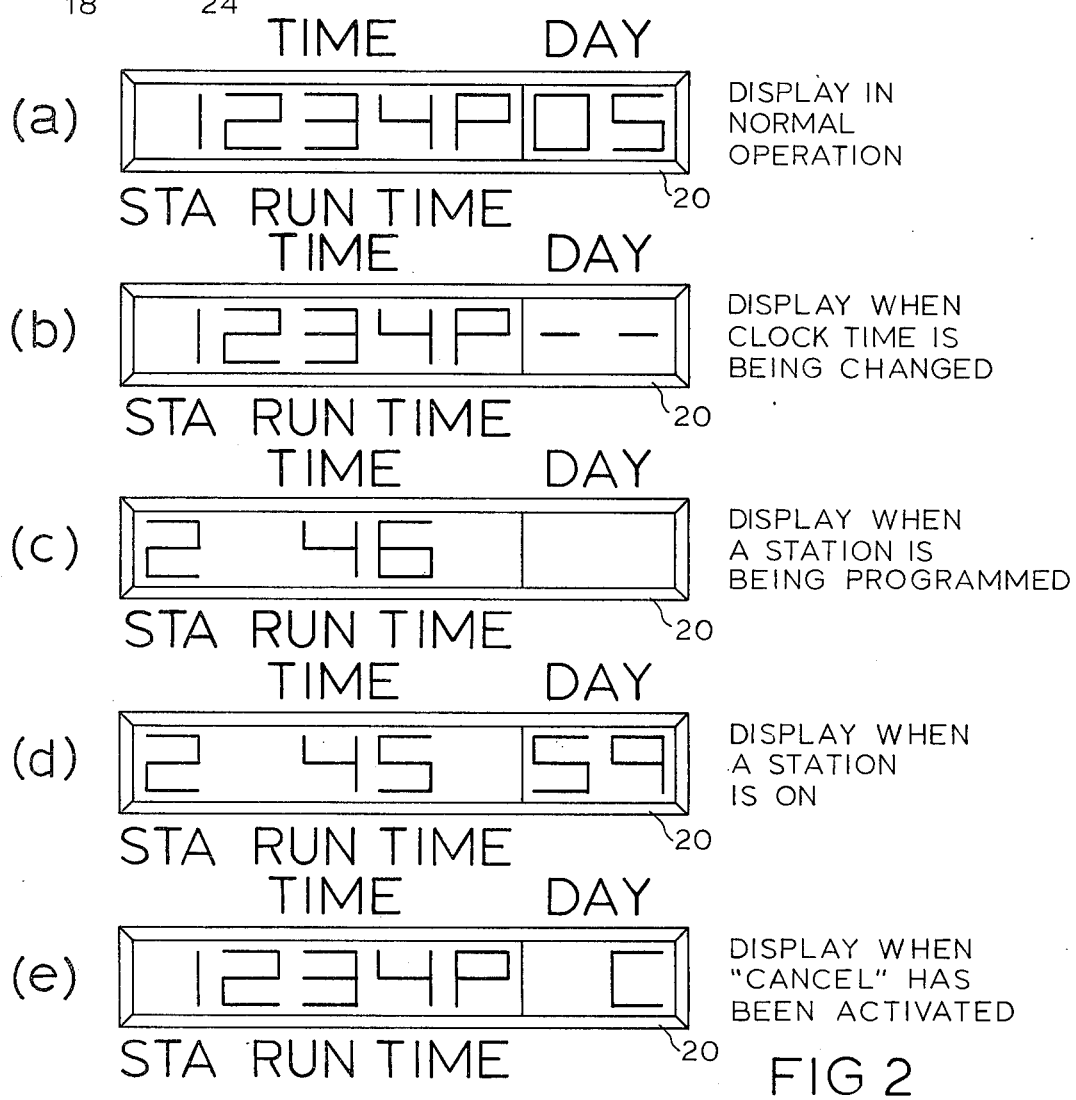

(b)

(c)

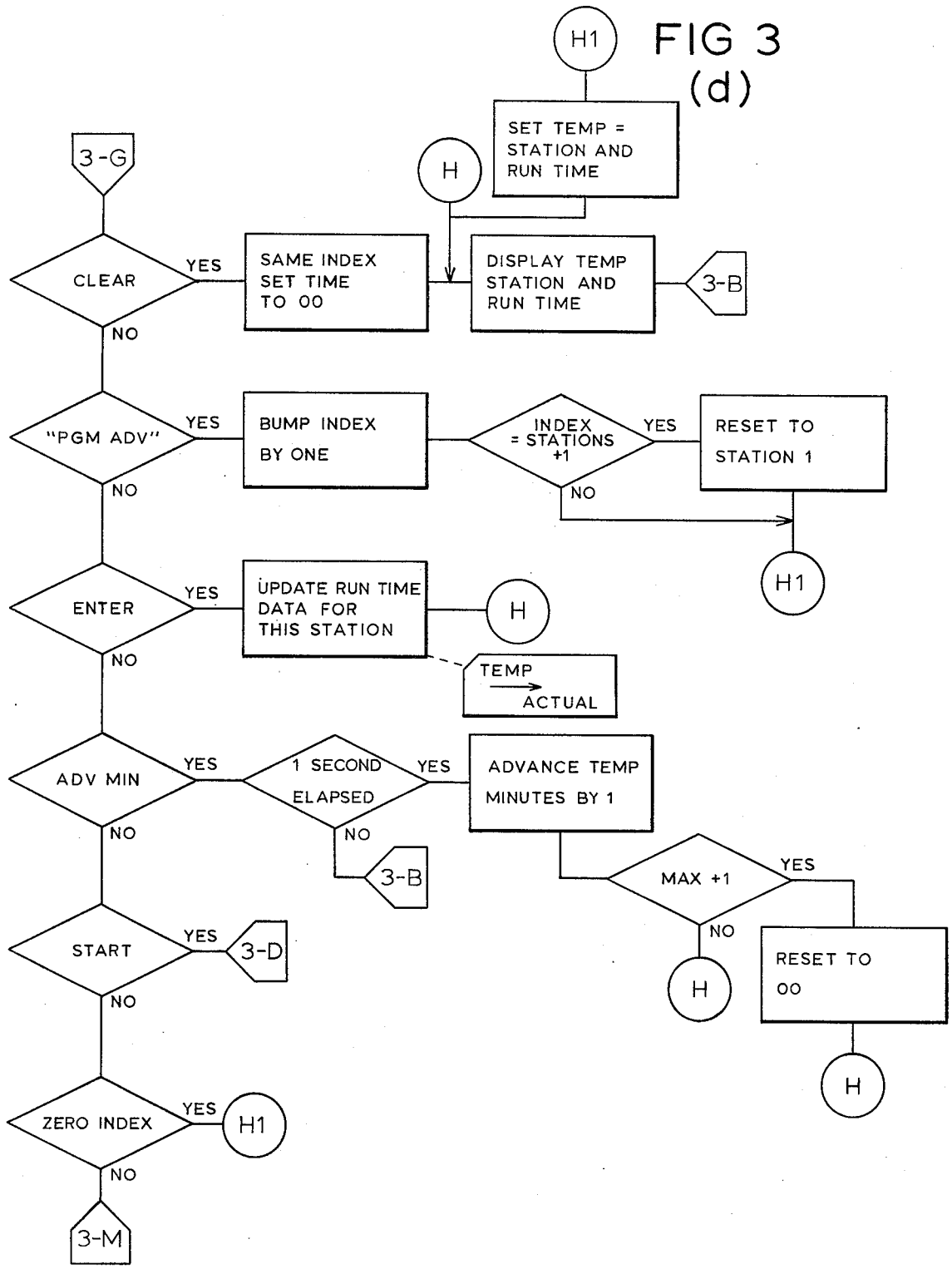

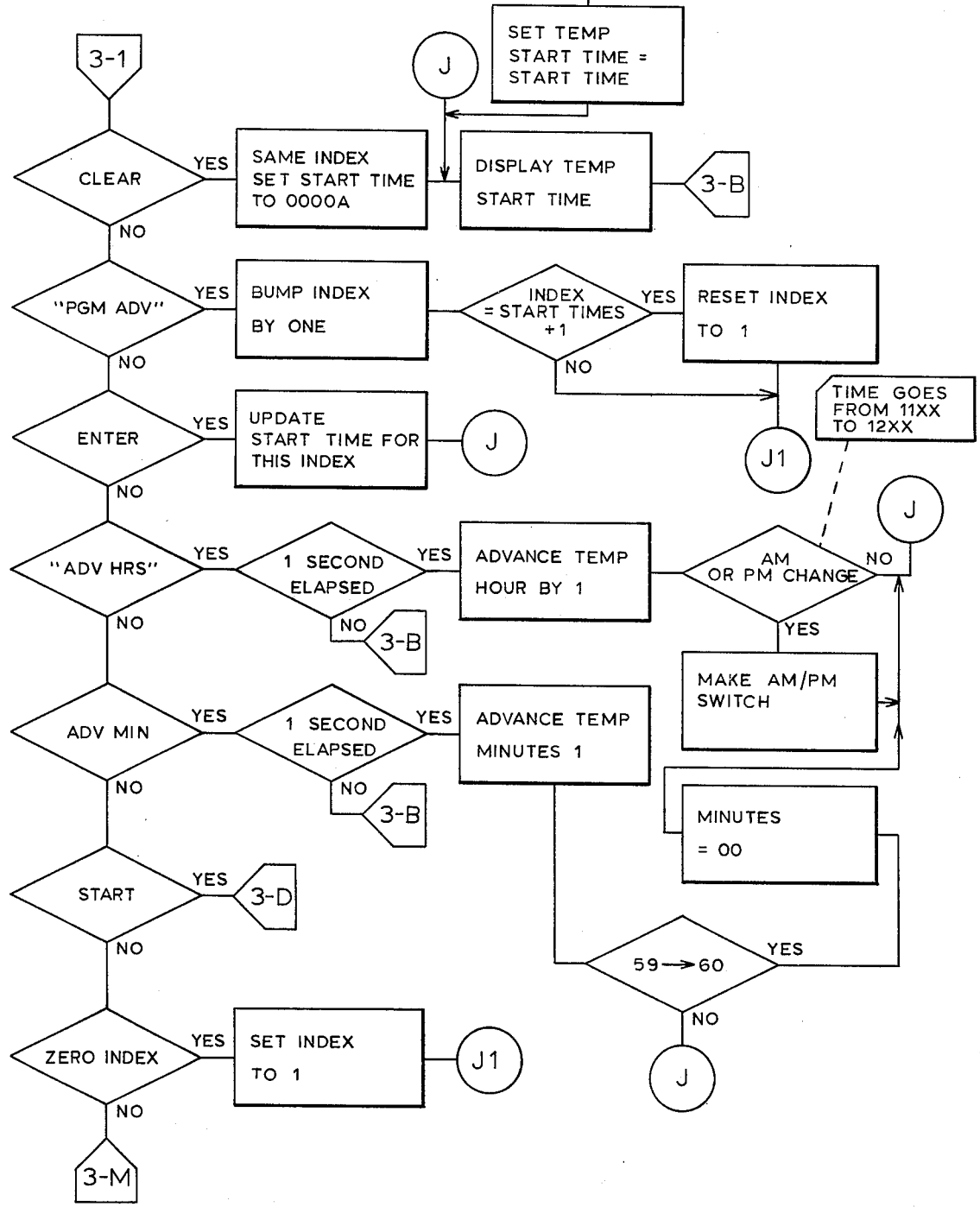

(g)

SIMPLIFIED IRRIGATION CONTROLLER

BACKGROUND OF THE INVENTION

The present invention relates to controllers for irrigation systems and more particularly to irrigation system controllers employing solid state logic and control circuitry.

In the copending United States application entitled "Automatic Irrigation Sprinkler System Controller" by T. L. Kendall, L. G. Downing, and J. A. Ray, Ser. No. 866,049, filed Dec. 30, 1977, assigned to the common assignee of this application, there is described a solid state controller for the operation of irrigation systems. The solid state controller described in said application is particularly adapted for large commercial irrigation systems such as those employed in parks, golf courses, and the like. Accordingly, the input keyboard and the logic sequences incorporated therein are adapted to provide the operator with a wide selection of features. Start times, run times, and the like are directly input as alpha-numeric data through the keyboard which incorporates a plurality of numerically associated keys for the input of such data.

The advantages attendant to such automated programmable solid state controllers are of equal benefit to the average homeowner. The time normally devoted to the diligent watering of lawn and plant areas can be a major consideration to a homeowner. This is particularly true when a homeowner wishes to be gone for extended periods of time wherein arrangements must be made, with attendant cost, for someone to come in to perform the watering chores normally accomplished by the homeowner. While the benefits of an automatic controller for the home irrigation system is, therefore, apparent, they are not such as to justify the expense of a complicated professional controller as described in the foregoing application.

Wherefore, it is the object of the present invention to provide a simplified solid state irrigation controller particularly adapted for low cost availability to the non-professional user.

SUMMARY

The foregoing objective has been met by the controller of the present invention having solid state logic and control means including means for storing irrigation information including real-time clock logic maintaining the current second, minute, hour, and day of an irrigation sequence and having a data input and a control signal output for generating control signals identified with particular sprinkler stations as a function of the irrigation information including lists of operation durations and operation start times to be associated with each of a plurality of outputs and a matrix of a plurality of sequential days indicating the desired operational status of each of the plurality of outputs on each of the days, data input means connected to the data input for allowing an operator to input irrigation information and override signals into the solid state logic and control means, and, signal decoding and station power means having an input connected to the control signal output and a plurality of outputs to which individual sprinkler stations can be connected for receiving the sprinkler identified control signals and outputting a voltage at the output to which the sprinkler station identified with the control signal is connected whereby the sprinkler station is turned on in response to an associated control signal from the logic and control means, wherein simplification is provided by the improvement comprising display means for displaying alpha-numeric data to an operator; the data input means consisting only of means for iniating system parameterization logic sequences and means for inputting operator decisions; and, the logic and control means including logic for causing the current real-time clock data and irrigation information to be selectively displayed to the operator on the display means, inputting operator decisions relative to the displayed data and information from the data input means, and updating the stored real-time clock data and irrigation information on the basis of the decisions whereby the operator is not required to input data but only affirm or reject data presented by the controller. In particular, the foregoing is accomplished by having the data input means for inputting operator decisions include program advance switch means for allowing the operator to indicate that the logic should advance to the next step in the logic sequence being executed; hour advance switch means for allowing the operator to indicate that the logic should advance the currently displayed time in hour increments; minute advance switch means for allowing the operator to indicate that the logic should advance the currently displayed time in minute increments; and, the logic and control means including logic for sampling the program, hour and minute advance switch means and for advancing the currently displayed values in response to operator inputs to the switch means.

DESCRIPTION OF THE DRAWINGS

FIG. 1 is a drawing of the simplified input panel associated with the controller of the present invention.

FIG. 2 depicts the configuration of the display of the input panel of FIG. 1 during normal operation, clock time changing, station programming, station "on", and when the "cancel" option has been activated.

DESCRIPTION OF THE PREFERRED EMBODIMENT

Figure 3:
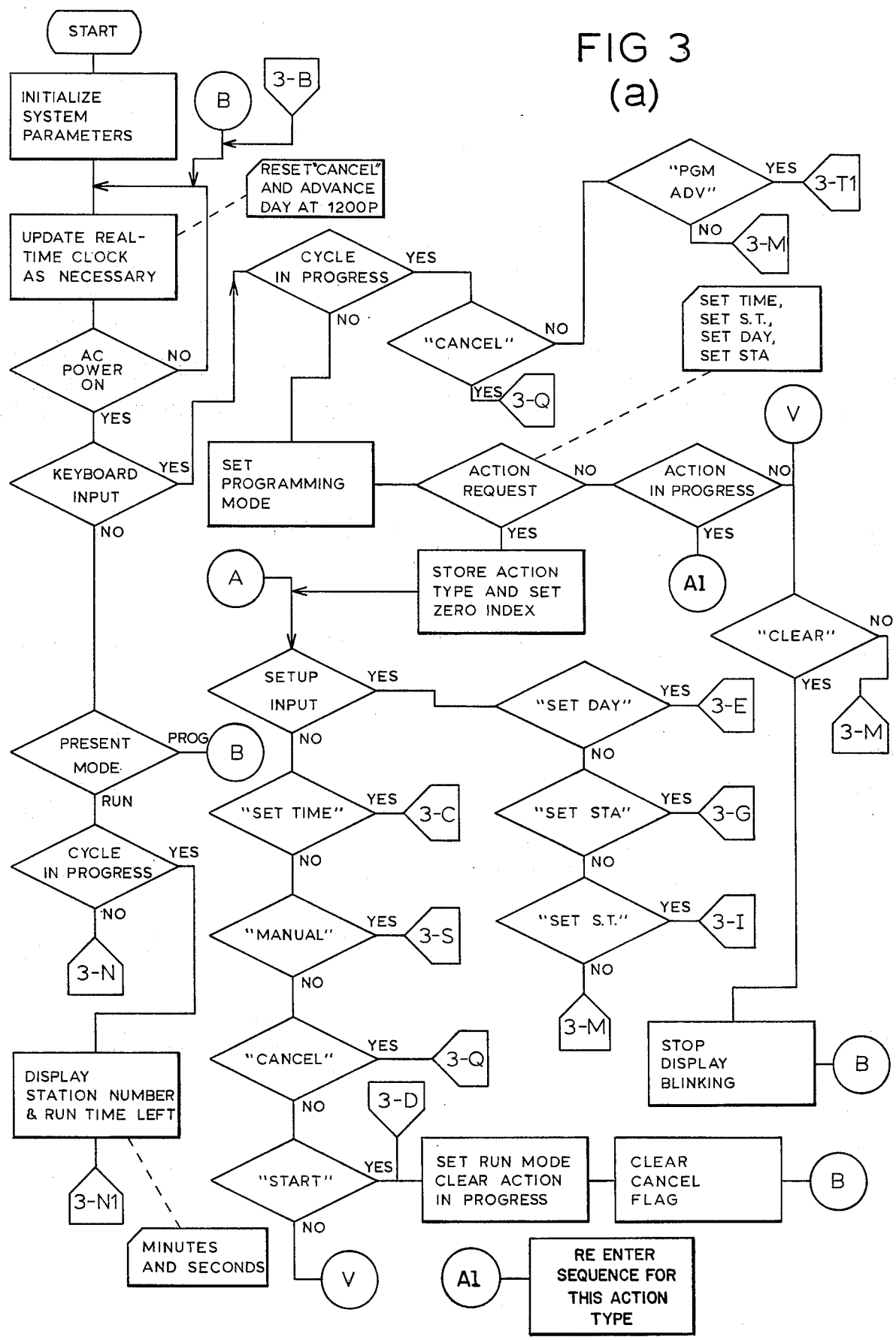
FIG. 3, comprising segments 3(a) through 3(g) is a flow chart depicting the logic sequence incorporated in the present invention to accomplish the objectives thereof.
Figure 3:
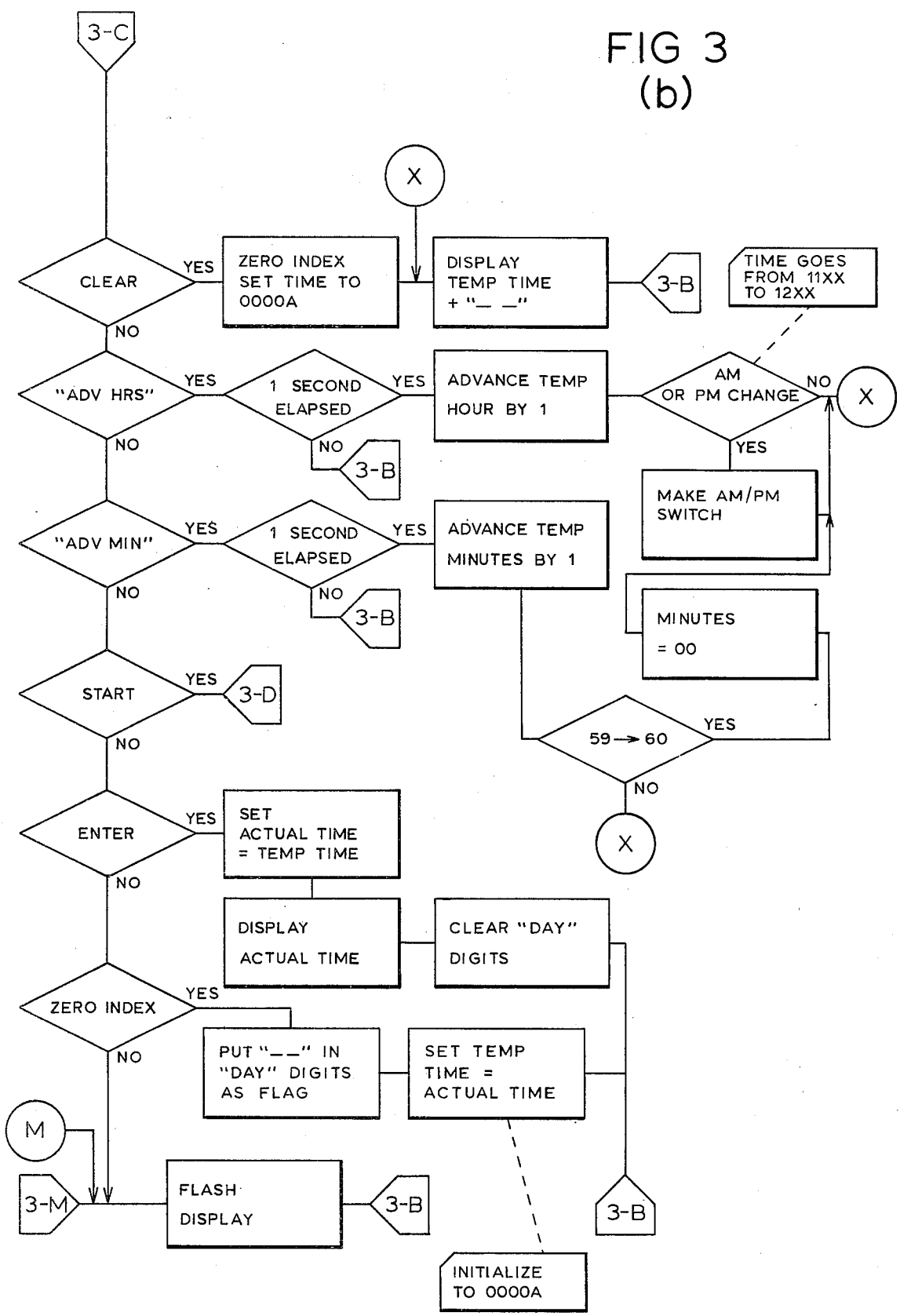
Figure 3:
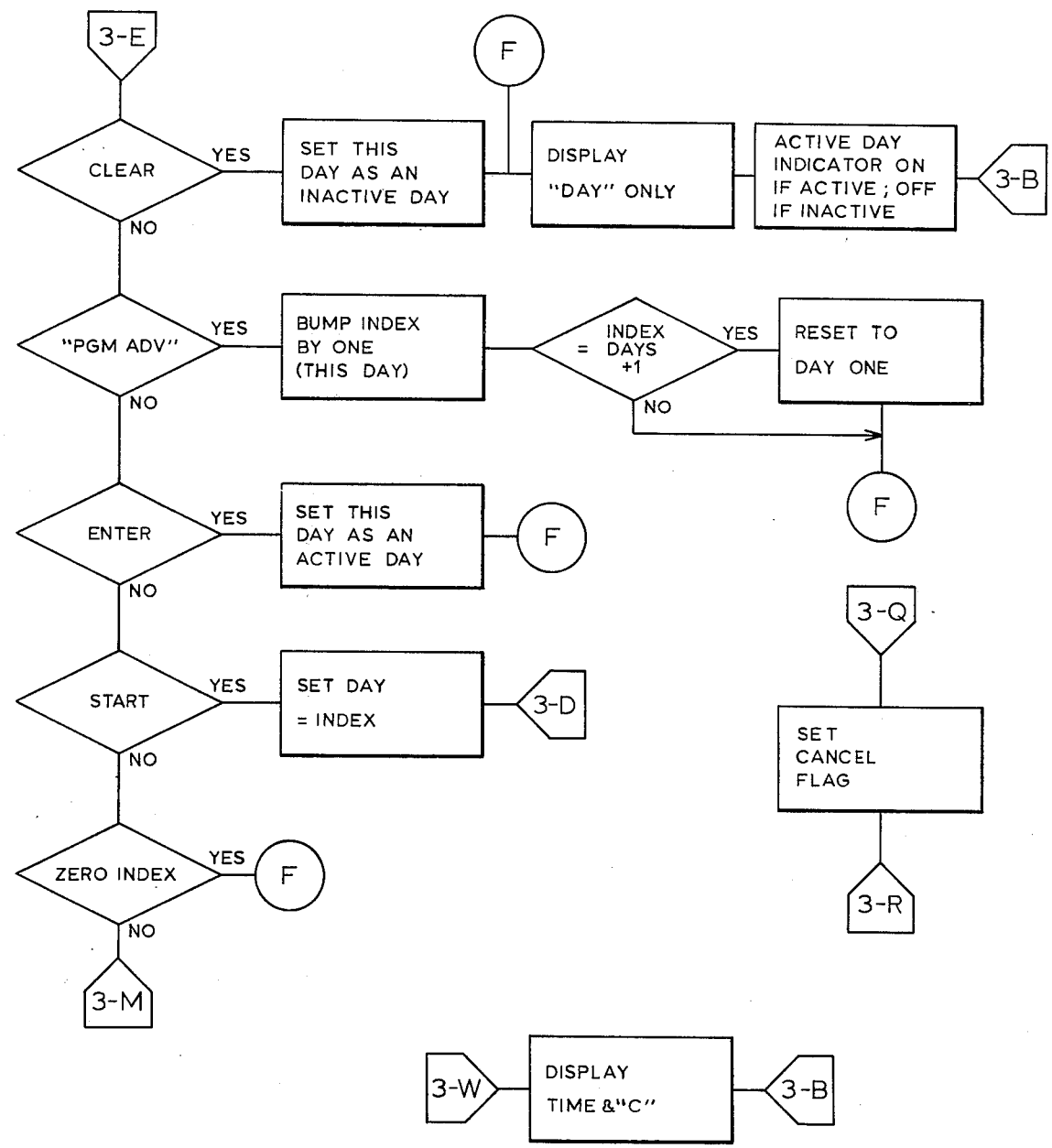
Figure 3:
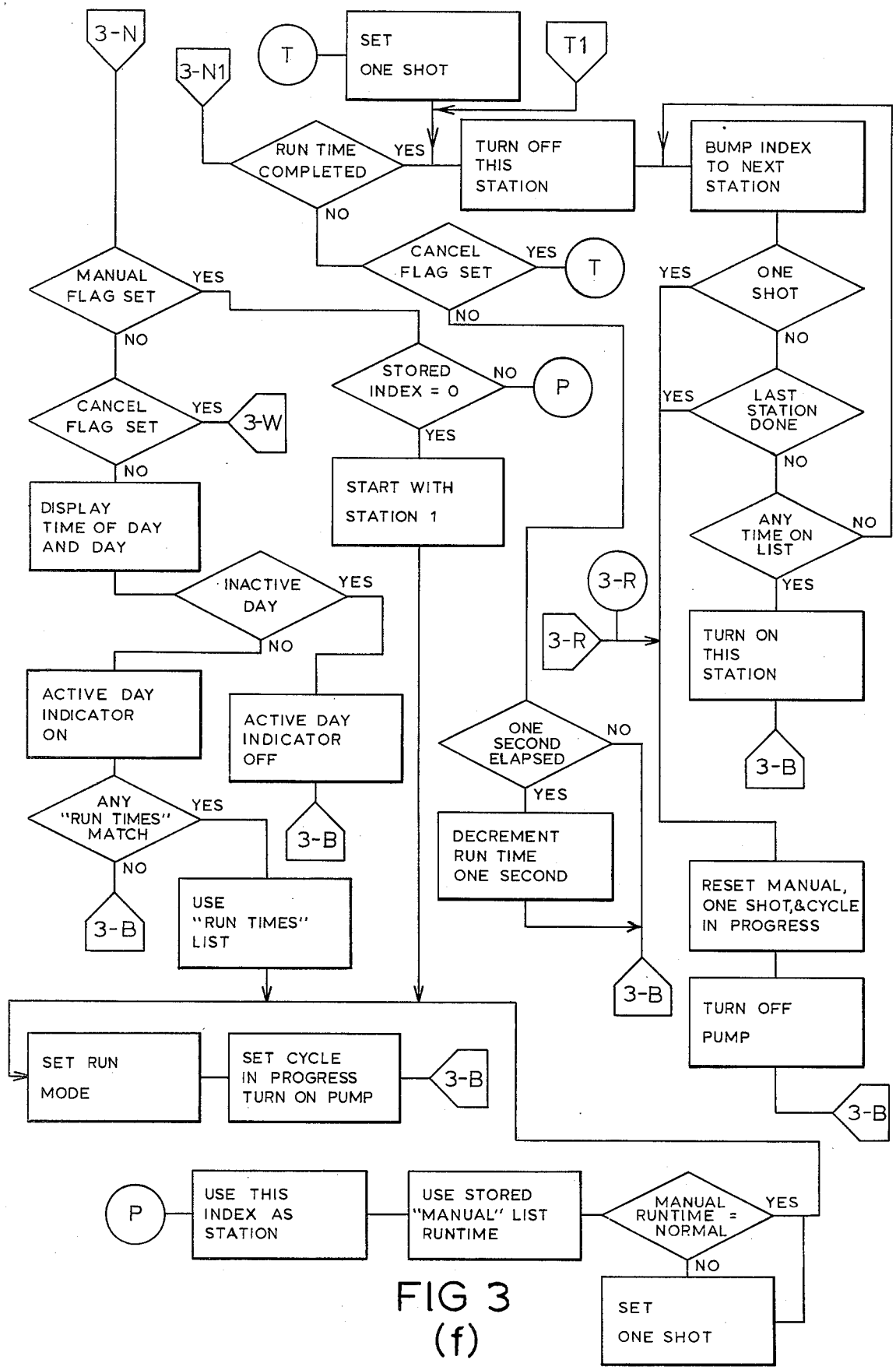
Figure 3:
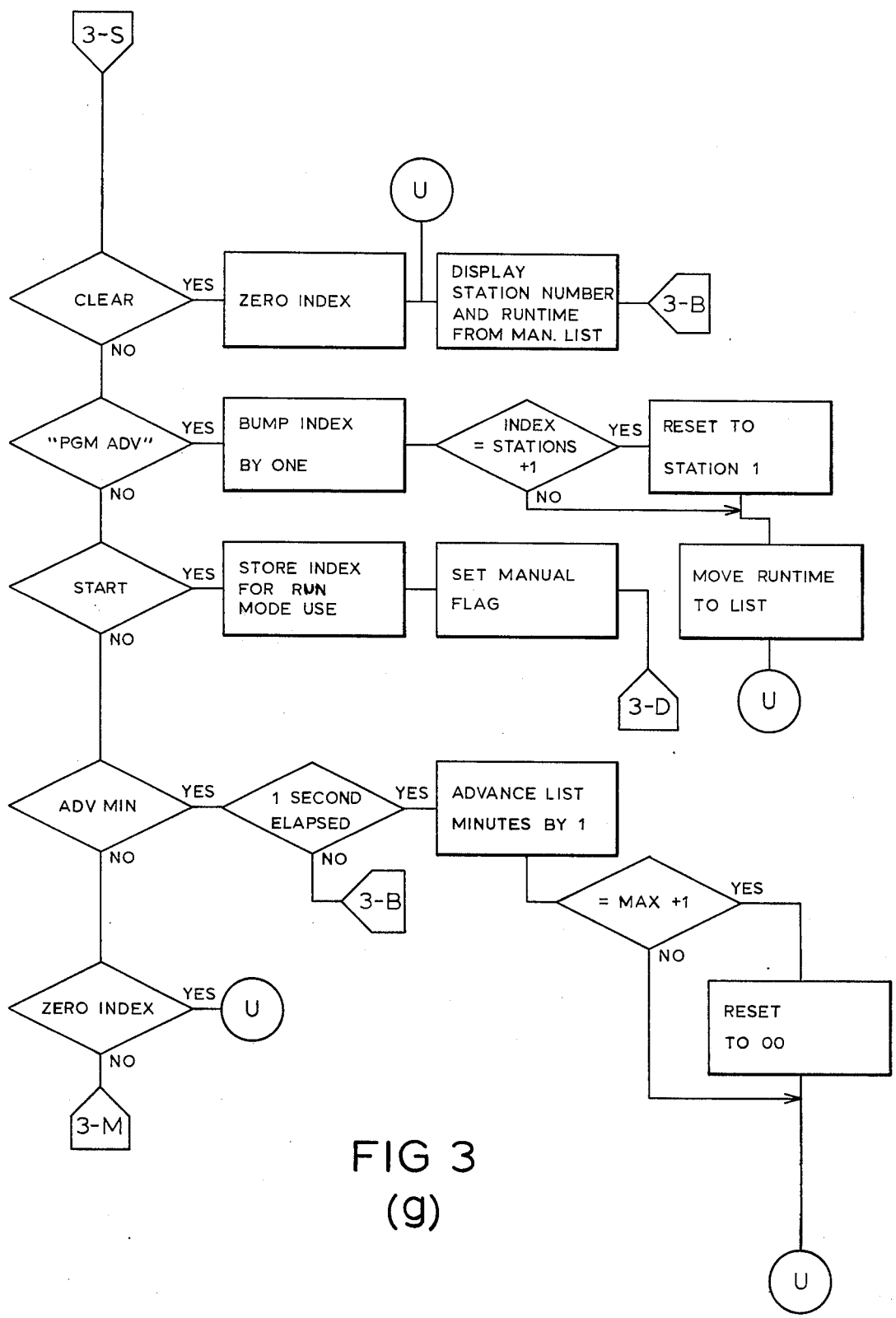

Referring now to FIG. 1, the typical solid state irrigation controller comprises a power supply and logic circuit indicated generally as 10 having power inputs 12 connected thereto adapted for connection to an external source of power (e.g. 117 VAC) and a plurality of output leads 14 adapted for connection to one or more irrigation sprinkler stations 16. A detailed description of the operation of power supply and logic circuit 10 in conjunction with the operation of sprinkler stations 16 is contained in the aforementioned application to Kendall, et al. The control signals and output techniques described therein are advantageously incorporated in the present invention. The improvement of the present invention lies in the input/output means and logic sequence associated therewith to be described hereinafter.

Continuing with reference to FIG. 1, power supply and logic circuit 10 has an operator's panel 18 operably connected thereto. Operator's panel 18 contains a multi-purpose, alphanumeric display 20, an operator's keyboard 22 having twelve switches 24, an "active day" indicator 26, a "low battery" indicator 28 and a switch 29 for manually turning of the controller outputs. In the preferred embodiment of the present invention, as built and tested by the assignee of the present invention, display 20 comprises a 7 digit panel.

Power supply and logic circuit 10 includes memory and logic means for maintaining a current real-time clock value indicating the time of day as hours and minutes A(M) and P(M). That is, a day begins at 1200 A and proceeds through 1159 A, thence to 1200 P through 1159 P and thence to 1200 A to begin once again. Further, a 14-day watering sequence is maintained. That is, each time the real-time clock hour passes from 1159 P to 1200 A (corresponding to midnight) the memory location containing the day is advanced by one. The day counter proceeds from 01 through 14. When the logic sequence finds that the day is to be advanced from 14 to 15, the current day is reset to 01. Each day of the watering sequence is indicated as being an "active" (watering) day or a "non-active" (non-watering) day. No other options are provided. Six memory locations within power supply and logic circuit 10 are devoted to times of day at which a sprinkler output sequence is to be initiated. As will be hereinafter developed in greater detail, the logic within power supply and logic circuit 10 continually compares the entries on this "start time" list to the current time of day. It the particular day is an "active" day and watering on that day has not been cancelled by the operator by techniques to be hereinafter described, each time a match is found between the current time of day and an entry on the "start time" list, an output sequence in initiated. During an output sequence, the sprinkler stations 16 are turned on in sequence for individual preselected watering time. That is, station 1 is turned on for its time, then turned off and station 2 turned on for its watering time, etc. When the last station watering time has been completed, the logic sequence once again begins looking for a match between the current time and the "start time" list entries.

Referring now to FIG. 2, the operation of the display 20 in conjunction with the foregoing method of operation is shown. In FIG. 2(a), display 20 is shown in its normal operation configuration displaying the TIME and DAY. The left four digits indicate the time of day (1200–1159). The fifth position from the left indicates A or P (AM or PM). The sixth and seventh positions indicate the day of the watering sequence (01–14). It is to be understood that the specific data being described herein in conjunction with the present invention is that incorporated in the tested embodiment thereof and is not meant to be exclusive. Thus, a 24-hour clock could be incorporated proceeding from 0001 through 2400 with the elimination of the AM and PM indicators. Likewise, fewer or greater days could be incorporated for the watering sequence. In actuality, although the display 20 having two digit positions dedicated to the day could be used for a 99-day watering sequence, typically the number of volatile memory locations available in the small micro-computers incorporated in such apparatus are insufficient to allow the use of such large data quantities.

FIG. 2(b) shows the display 20 during the setting or changing of the time of day. The left four digits indicate the time of day (1200–1159) and the fifth position from the left indicates A or P as previously described with relation to FIG. 2(a). The sixth and seventh positions, however, display a "dash" (—) as a flag to the operator that the controller logic is locked in the programming mode changing the time. As will be seen hereinafter, this is important since all other functions are locked out while programming (re-parameterization of watering data) is taking place. Other programming operations are readily apparent from the display as will be apparent from the description of FIG. 2(c) which follows hereinafter.

FIG. 2(c) indicates the typical use of the display 20 when the operator is programming the controller. "Programming" as used herein refers to the operation of the operator changing one or more of the system data parameters using the keyboard 22 in the manner to be described hereinafter in greater detail. The display 20 of FIG. 2(c) indicates that a runtime (RUNTIME) of 46 minutes is in the process of being established for station (STA) number 2. [Note that while the displayed runtime left for operation of a station (as to be described in relation to FIG. 2(d)) is in minutes and seconds, the parameterization data is input only in whole minutes.] During programming, the day digits (DAY) are blank to differentiate the "programming" display of FIG. 2(c) from the "station on" display of FIG. 2(d) to be described next. The various other uses of display 20 in conjunction with the programming mode will become more apparent when considered in conjunction with the logic sequences to be discussed hereinafter.

FIG. 2(d) indicates the use of the display when an output sequence is in operation. In the present invention, power supply and logic circuit 10 is designed to indicate the station presently turned on (STA) and the number of minutes and seconds yet to be run for that controller (RUN TIME) during an output sequence. Thus, as shown in FIG. 2(b), station 1 has finished its output watering period for this output sequence, station 2 is presently turned on, and station 2 has 45 minutes and 59 seconds left to run. The run time indicator is decremented on the display 20 by the logic until such time as the run time for station 2 has been completed (e.g. display=2 00 00). At that time in the example of FIG. 2(d), the "STA" (station) indication will be advanced to "3" and the run time initiated to the initial run time for station 3.

FIG. 2(e) depicts the indication on display 20 when a particular day has been "cancelled". As previously mentioned, each day of the watering sequence is initially described as an "active" (watering) day or an "inactive" (non-watering) day. As will be hereinafter described, the operator is provided with means for cancelling any part or all of an active day for that day only. That is, the day in the sequence will remain as an "active" day, but the particular day will have the output sequence cancelled until such time as the time of day logic passes to the next day of the watering sequence. When in a "cancelled" state, the time of day is indicated in its normal manner. The "DAY" indicator, however, is replaced by a "C" in place of the day number such that the cancelled status is readily apparent to the operator. Additionally in the preferred embodiment, "ACT DAY" indicator 26 is provided on operator's panel 18 which is illuminated any time the current day is an "active" day and not cancelled. In this manner, the operator is always apprised of whether watering will be occurring on the present day by the illumination or non-illumination of the active day indicator 26.

Referring now to FIG. 3, a logic sequence for incorporation within power supply and logic circuit 10 to accomplish the objectives of the present invention is shown. The logic of FIG. 3 can best be understood with simultaneous reference to FIGS. 1 and 2. The logic sequence begins at "START" in FIG. 3(a). The system parameters are first initialized and then the real-time clock stored data is updated as necessary to maintain the time and day in its current status. As described in greater detail in the aforementioned Kendall, et al copending application, connector B within FIG. 3 represents the point of ultimate return of all sequences within the logic sequence hereinafter described. Updating of the real-time clock is the highest priority within the logic sequence. The logic never loops upon itself awaiting operator input but, rather, constantly cycles through the sequence updating the real-time clock and watching for operator actions and internal tasks to be performed.

The logic next determines if the AC power is connected to power supply and logic circuit 10 through power input leads 12. If not, only the maintaining of the real-time logic memory locations is accomplished through the use of a battery back-up system (as described in the aforementioned copending Kendall, et al application) until such time as the AC power is restored.

The logic next checks for a keyboard input. That is, has an operator activated one of the switches 24 on the keyboard 22. If no keyboard input has been made and the logic is presently in the "programming" mode, return is made to on-page connector B to await the operator input while updating the real-time clock data as previously mentioned. If the logic is presently in the "run" mode the determination is next made as to whether an output cycle is now in progress. Note that the programming mode and run mode with a cycle in progress are mutually exclusive. That is, when the controller is actively turning on the sprinkler stations 16 according to an output sequence, no programming by the operator can take place until such time as the output sequence has been cancelled. Likewise, any time the operator is actively programming the controller with new data, the logic sequence does not check for matches in the time of day and "start time" list. If no cycle is in progress and the logic is in the run mode, transfer is made to off-page connector 3-N located in FIG. 3(f) to accomplish the time match searching in a manner to be described hereinafter. If a cycle is in progress, the station number and run time remaining (minutes and seconds) for that station are displayed as previously discussed in conjunction with FIG. 2(d) and control is transferred to off-page connector 3-N1 also located within FIG. 3(f).

Referring now to FIG. 3(f), the logic associated with the run mode is shown. Connector 3-N is entered if no cycle is presently in progress. The logic first checks to see if a "manual" request has been made by the operator. The manual request allows the operator to selectively start one complete output sequence, a partial sequence, or, alternatively, one station output for a temporary "one-shot" period of time. That is, if, for example, station 5 normally operates for five minutes, the operator can start station 5 one time for ten minutes after which time station 5 is turned off. The normal five-minute run time associated with station 5 is unaffected by such a manual one-time operation request. In this manner, the operator is able to get selective additional watering to a watering station without affecting the normal operation of the controller. As will be further described in conjunction with the programming modes, the logic initially presents the operator with a station "0" display when the manual request is made. If station 0 is indicated to the logic by the operator as the desired station, a complete normal timed watering sequence will be initiated immediately for all stations beginning with station 1. If a station other than station 0 is indicated to the logic by the operator and the runtime is not changed temporarily from the "normal" runtime for that station, that station and the following ones on the list with "normal" runtimes assigned are operated in sequence in a "partial" normal timed watering sequence. If, on the other hand, the operator advances to a specific station number and temporarily changes the runtime from "normal", only the specific station entered will be run in the manual mode for the temporary runtime. This logic can be seen following the "yes" path from the "manual flag set"? decision block. The logic first checks to see if the stored index equals zero. If it does, the sequence is started with station 1 and entry is made into the logic sequence path for the non-manual mode as if a time match had been found. If the stored index is not equal to zero, transfer is made to on-page connector P which causes the index to be used as the individual station to be started, the manual runtime employed, a "one-shot" condition to be set if the manual runtime is not equal to the normal runtime, and transfer made to the same point in the logic sequence previously mentioned wherein the time match found path for the non-manual mode sequence is employed.

If the manual flag is not set, the logic sequence next checks to see if the cancel flag has been set. If the cancel flag has been set, transfer is made to off-page connector 3-W located within FIG. 3(c) which causes the current time and the "C" to be displayed followed by a transfer to the central return path at off-page connector 3-B. If the cancel flag has not been set, the logic next displays the time of day and day (as in FIG. 2 (a)) and checks to see if this is an inactive day. If the day has been designated as inactive, the "active day" indicator (ACT DAY) 26 is turned off and transfer is made once again to off-page connector 3-B to update the real-time clock data as there is no further action to be taken within the run mode. If this is not an inactive day (i.e. an active day), the ACT DAY indicator 26 is turned on and the logic checks for time matches between the current time by hour and minute and the entries of the "start time" list. If no start time matches are found, transfer is made to off-page connector 3-B. If, however, a start time match is found, the pre-set list of station run (watering) times (to be hereinafter discussed) is employed. The logic next sets the run mode, sets the cycle in a progress condition, and activates the circuit to turn on the master pump (if incorporated within the system). Transfer is then made to the main entry point at off-page connector 3-B.

With a cycle in progress, the logic contained within FIG. 3(f) is entered at connector 3-N1. This portion of the logic sequence first determines if the watering time (run time) has been completed for the station presently being operated. If not, the logic next checks to see if the cancel flag has been set. If not, the runtime is decremented on a one-second basis and the logic sequence exits to the beginning of the clock update sequence at off-page connector 3-B. If the cancel flag has been set, transfer is made to on-page connector T which causes a one-shot flag to be set and the logic sequence to be entered as if the station run time were completed. At such time, or when the station run time is actually completed, the station is turned off, and the index is bumped to the next station.

The logic next determines if the one-shot flag has been set. If yes, transfer is made to on-page connector 3-R which resets the manual, one-shot and cycle-in-progress conditions, turns off the pump (if any) and transfers control to off-page connector 3-B. If the one-shot condition is not present, the determination is next made whether or not the last station has been completed. If the last station is completed, transfer is made once again to on-page connector 3-R to terminate the output sequence as previously discussed. If the last station is not completed, the logic next checks to see if any time is on the "runtime" list for this station. Note that an individual station can be deactivated by merely entering a time of zero minutes on the runtime list. If there is no time (time=0), transfer is made to the point in the logic sequence where the index is bumped to the next station (previously discussed). If there is time on the "runtime" list (time≠0), the station is turned on, and transfer is made to the central point at off-page connector 3-B.

Returning now to FIG. 3(a), let us now assume that the decision block "KEYBOARD INPUT"? has been answered "yes". The logic next checks for a cycle-in-progress condition. As previously mentioned, the "run" and "programming" modes are mutually exclusive. When in the programming mode, only a "cancel" request or a "program advance" request is operable. Thus, following a keyboard input the logic first checks to see if a cycle is presently in progress. If yes, it next checks to see if the cancel (CAN) button on keyboard 22 (and switch 24 associated therewith) has been activated. Pushing the cancel (CAN) button while an output sequence is in progress causes the sequence to be terminated as will be seen from the logic description which follows. If the cancel (CAN) button has not been depressed, the logic checks to see if the program advance (PGM ADV) button has been depressed which, when an output sequence is in progress, causes the presently active station to be terminated as if its watering time (runtime) had expired. If the program advance (PGM ADV) button has been depressed, transfer is made to off-page connector 3-T1 in FIG. 3(f) which enters the logic sequence therein at the point where the runtime has been completed. If not, transfer is made to off-page connector 3-M located within FIG. 3(b) which causes the display 20 to be flashed to signify to the operator that an illegal keyboard entry has been made. Following initiation of the keyboard flashing, transfer is made to off-page connector 3-B in the usual manner. If a cycle is in progress and a cancel request has been entered, transfer is made to off-page connector 3-Q located within FIG. 3(c) which sets the cancel flag and transfers to off-page connector 3-R located within FIG. 3(f)—which was discussed previously.

If there has been a keyboard input and no cycle is in progress, the programming mode is set which, as previously discussed, locks out the run mode. The logic next determines if the keyboard input is an action request. That is, is the operator attempting to begin a programming logic sequence. If yes, the action type is stored and the index is zeroed to indicate the start of a sequence. Transfer is then made to on-page connector A which will be discussed shortly hereinafter. Assuming for the moment, however, that no action request has been made, the logic next checks to see if an action is in progress. If yes, transfer is made to on-page connector A which, in this case, employs the action type and index as previously set and as subsequently modified by the logic sequence to be described hereinafter. If no action is in progress, the logic next checks to see if the clear (CLR) button has been depressed. If not, transfer is made to off-page connector 3-M to begin the display blinking as an illegal keyboard input condition exists. If the clear (CLR) button has been depressed, the blinking of the display is stopped and transfer is made to on-page connector B.

At on-page connector A, the logic first determines whether a set-up input has been made. A set-up input is that type input associated with actual watering or irrigation information. A non-set-up type input is one associated with such items as setting the time of day, requesting manual mode, a cancel request, and a start request (which causes the run mode to be reinitiated).

Following a typical system initialization routine which an operator (e.g. homeowner) would follow upon initial installation of a controller such as described in the present invention, let us first assume that this is not a set-up input and that the SET TIME button has been depressed. This sequence is employed to set the current hour and minute in the real-time clock memory locations. To accomplish this, transfer is made to off-page connector 3-C located within FIGS. 3(b).

Note that the current time is initialized to the illegal value 0000A. Such illegal values are conveniently used throughout the logic to indicate to the logic initial passes through particular logic paths. At 3-E, the logic first checks to see if the clear (CLR) button has been depressed. If it has, this causes the index to be zeroed and the time once again set to 0000A. Beginning at on-page connector X, the temporary time is next displayed and transfer of control made to off-page connector 3-B. As mentioned, in the logic of the present invention, temporary storage locations are used for the modification and display of data until such time as the operator has indicated that the modified data is to be substituted for the currently active data by input actions to be described. By so doing, the operator can display and manipulate data and then terminate a sequence without actual data substitution whereby the current data is not modified by the uncompleted substitution sequence. If the clear (CLR) button has not been depressed, the logic next checks to see if the advance hours (ADV HRS) button has been depressed. If yes, the logic next checks to see if one second has elapsed. If one second has not elapsed since the previous advancement of the hour, transfer is made to off-page connector 3-B. When one second has elapsed, the hour is advanced by one. If an AM or PM change is required (i.e. hours going from 11 to 12), this is next accomplished. Transfer is then made to on-page connector X to display the updated temporary time. Note that by the foregoing, as long as the operator maintains the advance hours (ADV HRS) button depressed, the hour displayed is advanced by one per second. Alternatively, though not preferred, the logic could be adapted to cause the hour to be advanced by requiring that the advance hours (ADV HRS) button be depressed and released for each advancement desired. If the advance hours (ADV HRS) button has not been depressed, the logic next checks to see if the advance minutes (ADV MIN) button has been depressed. If yes, the logic next checks to see if one second has elapsed (in the same manner and for the same reason as with the advance hours (ADV HRS) button previously discussed) and transfers to off-page connector 3-B if it has not. When one second has elapsed, the "minutes" count is advanced by 1. When the advancement is from 59 to 60, the minutes count is reset to 00. Note that "minutes" and "hours" are advanced separately—there is no interaction between the two. Upon the completion of the minute update, transfer is made to on-page connector X to display the updated value in temporary storage.

If an advance minutes request has not been made, the logic next checks to see if the start (S) button has been depressed. Any time the start (S) button is depressed, it is an indication by the operator that the programming mode should be terminated and the run mode resumed. This is accomplished by transfer to on-page connector 3-D contained within FIG. 3(a). If the start (S) button has not been depressed, the logic next checks to see if the enter (ENT) button has been depressed. If the enter (ENT) button has been depressed, the logic sets the actual time equal to the temporary time, displays the actual time, and branches to off-page connector 3-B. If the enter (ENT) button has not been depressed, the logic sequence finally checks to see if the index is zero, indicating the first time through the "—" flag is placed in the DAY digits, the temporary time is set to the actual time, and the logic sequence. If it is the first time through, transfer is made to off-page connector 3-B. If not, transfer is made to on-page connector M (note that on-page M is also off-page 3-M used elsewhere) which causes the display to be flashed an illegal keyboard entry as previously discussed.

Returning once again to the main logic sequence contained within FIG. 3(a), an initial set-up time the operator would most likely next execute the "set day" sequence by depressing the button of identical designation. Depressing the SET DAY button causes the logic to transfer control to off-page connector 3-E contained in FIG. 3-C. At connector 3-E, the logic first checks to see if the clear (CLR) button has been depressed. If it has, the day indicated by the index is set as an inactive day. The logic beginning at connector F next displays the day, turns the active day indicator 26 on or off as corresponds to the assigned designation, and exits to off-page connector 3-B. If the clear (CLR) button has not been depressed, the logic next checks for the program advance (PGM ADV) button having been pushed. If the program advance (PGM ADV) button has been pushed, the index (indicating the day) is bumped by one. If the index is bumped to the number of days plus one, it is reset to the first day. Thus, in the presently described embodiment, the index cycles from 01 through 14 and back to 01 again. Following the bumping of the index, transfer is made to on-page connector F. If the program advance (PGM ADV) button has not been depressed, the logic next checks for the enter (ENT) button. If the enter (ENT) button has been depressed, the day indicated by this index is set as an active day and transfer is made to on-page connector F. The logic next checks for depression of the start (S) button which indicates that the run mode should be resumed. When depressed, the "present day" is set to the index value and transfer is made to off-page connector 3-D. If the start (S) button has not been depressed, the logic checks for a zero index indicating the first time through (i.e. routine just started). If a zero index, transfer is made to on-page connector F. If not, the illegal input path at off-page connector 3-M is employed.

In addition to using the foregoing sequence to set individual days within the watering sequences as "active" and "inactive" days, the sequence is also used to set the controller to the desired day within the watering sequence. This is accomplished by depressing the SET DAY button to begin the sequence, depressing the program advance (PGM ADV) button until the desired day is displayed, and depressing the start (S) button to transfer control to the run mode with the present day equal to the index value.

Having set the time, the day, and the active/inactive status of the days of the watering sequence, the operator would next most likely set the station watering or run times (one per station) by depressing the set station (SET STA) button to transfer control to off-page connector 3-G located in FIG. 3(d). In the logic beginning at connector 3-G, the logic first checks to see if the clear (CLR) button has been depressed. If it has, the time associated with the station equal to the index value is set to 00 indicating no run time. Beginning at connector H, the logic then displays the station number and run time as updated and transfers control to off-page connector 3-B. If the clear (CLR) button has not been depressed, the logic next checks to see if the program advance (PGM ADV) button has been depressed. If it has, the index is bumped to the next station (or reset to station 1 upon being bumped past the last station) and transfer made to connector H1 where the temporary storage is set to this station and its runtime before continuing to display the values at connector H.

The enter (ENT) button is next checked with, if depressed, causes the temporary data to be used to update the actual data for the indexed station. If the enter (ENT) button has not been depressed but the advance minutes (ADV MIN) button has, the temporary minutes value is updated on a once per second basis (as previously discussed elsewhere) and reset to 00 upon overflow i.e. in going from 99 to 100 in the preferred embodiment followed by transfer to connector H. The start (S) button is then checked and responded to in substantially identical manner to that described in the logic of FIG. 3(b). Finally, a zero index condition causes transfer to H1 and lack thereof causes transfer to off-page connector 3-M.

As shown in FIG. 3(a), the final set-up input available to the operator is the set start time (SET S.T.) button which allows the operator to indicate start times within each day at which a watering cycle is to be initiated by transferring to off-page connector 3-I located within FIG. 3(e). As previously mentioned, in the preferred embodiment of the present invention, a "start times" list of six start times is provided. Thus, each active watering day has a watering cycle begun at any time (up to six times total) that an output cycle is not already in progress, the day has not been cancelled, the logic is not locked into the programming mode, and where the current real-time hours and minutes is found to be equal to an entry on the "start times" list. Note that all the values on the list are initialized to the illegal value of 0000 A. Any entry which remains at or is reset to 0000A will never be matched with the current real-time clock. Beginning at connector 3-I, the logic first checks for the depression by the operator of the clear (CLR) button. If the clear (CLR) button has been depressed, the start time for the indexed position on the "start times" list is set to 0000A. Beginning at connector J, the logic next displays the temporary start time associated with the present index value and transfers control to off-page connector 3-B. If the clear (CLR) button has not been depressed, the logic next checks to see if the program advance (PGM ADV) button has been depressed which causes the index to be bumped by one and reset to 1 if the index is equal to the number of start times plus one.

Thus, in a manner similar to logic sequences hereinbefore described, the index will sequence from 1 through 6 and be once again reset to 1 for the preferred embodiment having a six-entry "start time" list. The balance of the logic is substantially as previously discussed in relationship to other logic paths. For example, the program advance (PGM ADV) button logic is similar to that of FIG. 3(c). Similar enter (ENT) button logic is contained in FIG. 3(d). Logic for handling the advance hours (ADV HRS) and minutes (ADV MIN) buttons was described with relation to FIG. 3(b). As with the logic of FIGS. 3(b) and 3(d), the start (S) button logic merely transfers control to off-page connector 3-D. Only the zero index logic is slightly different in this case in that the index is bumped to 1 before transferring to connector J1 so that the first start time on the list is immediately displayed.

Returning now to FIG. 3(a), the remaining logic contained therein now will be discussed. The options available to the operator through the logic contained in the basic decision path of FIG. 3(a) not previously discussed begins following the decision block "SET TIME"?. If the SET TIME button has not been depressed by the operator, the logic next checks for the manual (MAN), cancel (CAN), and start (S) buttons. If none of the foregoing buttons have been depressed, transfer is made to on-page connector V previously discussed. If the start (S) button has been depressed, beginning at connector 3-D the logic sets the run mode, clears the action in progress and cancel flags, and transfers to on-page connector B. If the cancel (CAN) button has been depressed, transfer is made to off-page connector 3-Q contained in FIG. 3(c) wherein the cancel flag is set and transfer of control is given to off-page connector 3-R contained in FIG. 3 (f) as previously discussed. If the manual (MAN) button has been depressed, control is transferred to off-page connector 3-S connector 3-S contained within FIG. 3(g).

Beginning at connector 3-S, in the usual manner, the logic starts with station 0 (index=0) as set by the action request initiation sequence. The logic first checks for the clear (CLR) button being depressed. If the clear (CLR) button has been depressed, the index is zeroed and beginning with connector U the station number and run time from the manual list are displayed followed by a transfer to off-page connector 3-D. If the clear (CLR) button has not been depressed, the logic next checks for the program advance (PGM ADV) button. If this button has been depressed, the index is bumped by one and reset to station 1 if the index equals the number of stations plus one. For example, if the number of stations equal four, the index would sequence from 1 through 4 and back to 1 again. Following the update of the index, the normal run time for the station is moved to the manual list and transfer made to on-page connector U. If the program advance (PGM ADV) button has not been depressed, the logic next checks the start (S) button. If the start (S) button has been depressed, the index is stored for use by the run mode as previously described in conjunction with the logic beginning at off-page connector 3-N on FIG. 3(f). The manual flag is next set and control is transferred to off-page connector 3-D which once again begins the run mode. If the start (S) button has not been depressed, the advance minute (ADV MIN) button is checked and, if depressed, the logic checks to see if one second has elapsed. It not, transfer is made to off-page connector 3-B. If one second has elapsed, the manual list minutes are advanced by one and a check made to see if the minutes have been advanced to the limit. In the preferred embodiment of the present invention, the designated maximum watering time for one station is sixty minutes. Thus, upon the minutes being bumped to 61, they would be reset to 01. Following the advancement of the minutes, transfer is made to on-page connector U. Lastly, the logic checks for the zero index condition. If present, transfer is made to on-page connector U. If non-zero, transfer is made to off-page connector 3-M to blink the display indicating a keyboard input error.

As can be seen from the foregoing and the previous discussion in relation to the logic beginning at 3-N on FIG. 3(f), the manual sequence can cause an additional one time sequence through all the active stations for their normal run times, a partial sequence through some of the stations at their normal run times, or the initiation of single station at a modified run time.

Thus, it can be seen that the present invention has accomplished its objective of providing a simplified solid state controller for use in the home irrigation market wherein the operator is required only to initiate programming logic sequences and respond to data presented by the logic for the operator's approval, disapproval, or modification.

Having thus described my invention, I claim:

1. In a solid state controller for an irrigation system having solid state logic and control means including means for storing irrigation information including real-time clock logic maintaining the current minute, hour and day of an irrigation sequence and having a data input and a control signal output for generating control signals identified with particular sprinkler stations as a function of the irrigation information including lists of operation durations and operation start times to be associated with each of a plurality of outputs and a days by outputs/status matrix of data values defining the desired operational status of each of the plurality of outputs on each of a plurality of sequential days, data input means connected to the data input for allowing an operator to input irrigation information and override signals into the solid state logic and control means, and, signal decoding and station power means having an input connected to the control signal output and a plurality of outputs to which individual sprinkler stations can be connected for receiving the sprinkler identified control signals and outputting a voltage at the output to which the sprinkler station identified with the control signal is connected whereby the sprinkler is turned on in response to an associated control signal from the logic and control means, the improvement comprising:
   (a) display means for displaying alpha-numeric data to an operator;
   (b) the data input means consisting only of means for initiating system parameterization logic sequences and means for inputting operator decisions; and,
   (c) the logic and control means including logic for causing the current real-time clock data and irrigation information to be selectively displayed to the operator on said display means, inputting operator decisions relative to said display data and information from said data input means, and updating the stored real-time clock data and irrigation information on the basis of said decisions whereby the operator is not required to input data but only affirm or reject data presented by the controller.

2. The solid state controller claimed in claim 1 wherein:

(a) said data input means for inputting operator decisions includes;

program advance switch means for allowing the operator to indicate that the logic should advance to the next step in the logic sequence being executed;

hour advance switch means for allowing the operator to indicate that the logic should advance the currently displayed time in hour increments;

minute advance switch means for allowing the operator to indicate that the logic should advance the currently displayed time in minute increments; and, (b) the logic and control means includes logic for sampling said program, hour and minute advance switch means and for advancing the currently displayed values in response to operator inputs to said switch means.

3. The solid state controller claimed in claim 2 wherein:

said logic for sampling said program, hour and minute advance switch means and for advancing the currently displayed values includes logic to advance the displayed value on a periodic basis as long as said advance switch means associated with said displayed value is activated by the operator.

4. In a solid state controller for an irrigation system including a display, an input device having a plurality of operator actuatable switches, computer memory means for storing at least one time of day designated by hour and minute for turning on a sprinkler station and at least one time duration for running the sprinkler station when turned on, a real-time clock indicating the current time of day in hours and minutes, and logic and control means for comparing the real-time clock current time to the stored turn-on time for the sprinkler and for turning the sprinkler on for the stored duration when the real-time and stored turn-on time are equal, the improvement for simplifying the changing of the values of the aforementioned times comprising the logic and control means including logic for accomplishing the steps of:

(a) displaying the current stored value of the time;

(b) sampling the input device for operator inputs;

(c) exiting this logic sequence if a first switch has been activated by the operator;

(d) advancing the displayed time value by a fixed increment and returning to step (b) of this claim if a second switch has been activated by the operator;

(e) storing the displayed value as the new current value of the time and exiting this logic sequence if a third switch has been activated by the operator; and, (f) returning to step (b) of this claim if said first, second or third switch has not been activated.

5. The improvement to a solid state irrigation controller claimed in claim 4 wherein:

said step of advancing the displayed time value and returning to step (b) of claim 4 includes logic between the logic for said advancing and the logic for said returning for accomplishing the steps of:

(d1) sampling the input device;

(d2) if said second switch has been deactivated, accomplishing said return to step (b) of claim 4; and, (d3) returning to step (d1) of this claim if said second switch has not been deactivated, whereby the displayed time value will be advanced by one increment each time said second switch is activated and deactivated.

6. The improvement to a solid state irrigation controller claimed in claim 4 wherein:

said step of advancing the displayed time value and returning to step (b) of claim 4 includes logic between the logic for said advancing and the logic for said returning for accomplishing the steps of:

(d1) sampling the input device;

(d2) if said second switch has been deactivated, accomplishing said return to step (b) of claim 4; and, (d3) delaying for a preselected period of time before accomplishing said return to step (b) of claim 4 if said second switch has not been deactivated, whereby the displayed time value will be advanced by one increment each time period as long as said second switch remains activated.

7. The improvement to a solid state irrigation controller claimed in claim 4 and additionally including logic within the logic and control means for accomplishing a manually actuatable output to plurality of sprinkler stations controled by the controller from lists of sprinkler data associated with respective ones of the sprinkler stations comprising the steps of:

(g) displaying an indicator if a fourth switch has been activated by an operator;

(h) starting a normal sprinkler station output sequence and exiting this logic sequence if a fifth switch has been activated by an operator with said indicator remaining as displayed;

(i) modifying said indicator to indicate a specific sprinkler station and displaying the normal runtime of the indicated sprinkler station if a sixth switch has been activated by an operator;

(j) modifying the displayed runtime of the indicated sprinkler station if a seventh switch has been activated by an operator;

(k) starting a partial sprinkler station output sequence beginning with the indicated sprinkler station through the following sprinkler stations on the list and exiting this logic sequence if the displayed runtime has not been modified by the operator; and otherwise, (l) starting the indicated sprinkler station for the modified runtime only.

* * * * *